United States Patent [19]

Hüllwegen

[11] 4,088,906
[45] May 9, 1978

[54] TRANSMISSION LEVEL INDICATOR

[75] Inventor: Josef Hüllwegen, Altenbeken, Germany

[73] Assignee: Nixdorf Computer AG, Paderborn, Germany

[21] Appl. No.: 728,158

[22] Filed: Sep. 30, 1976

[30] Foreign Application Priority Data

Oct. 1, 1975 Germany .............................. 2543860

[51] Int. Cl.² ............................................. H03K 5/20
[52] U.S. Cl. ................................... 307/359; 328/127; 328/150
[58] Field of Search .................. 307/235 K; 328/150, 328/127

[56] References Cited

U.S. PATENT DOCUMENTS

| 3,749,942 | 7/1973 | Moses | 328/150 X |
| 3,835,419 | 9/1974 | Milne et al. | 328/127 X |
| 3,958,134 | 5/1976 | Maas | 307/235 K |

Primary Examiner—John S. Heyman
Attorney, Agent, or Firm—Gifford, Chandler, Van Ophem, Sheridan, & Sprinkle

[57] ABSTRACT

A transmission level indicator circuit arrangement is provided which generates an output signal when the amplitude of incoming data signals exceeds a predetermined threshold. The circuit arrangement includes an integrator which receives a first voltage obtained from the data signals superimposed upon a second voltage of opposite polarity which is proportional to the first voltage in relation to the signal noise ratio for interpretation of the data signals. The integrator output forms the transmission level indicator signal.

14 Claims, 4 Drawing Figures

TRANSMISSION LEVEL INDICATOR

BACKGROUND OF THE INVENTION

1. Field of the Invention

The present invention relates to a circuit for the production of a transmission level indicator signal during transmission of signals which have to be interpreted in dependence of their exceeding a prescribed transmission level in tele-communication facilities and especially data-transmitting systems.

2. Description of the Prior Art

In the transmission of signals, for example via MODEMS, base-band units and the like, error-free interpretation must be achieved at the receiving station. For example, errors can be caused on the transmission channel and even error-free receiving stations can produce wrong interpretation results. Moreover, such errors typically adversely effect the level of the received signals. Thus, if the signal level does not reach a prescribed minimum value at the receiving station, it is attributed to a disturbance and/or transmission error. For this reason, signal-transmission systems produce a so-called transmission-level-indicator-signal indicative that the received signals have a level which permits secure interpretation of the signals. This guarantees that, on one hand, only signals of a sufficient level are interpreted, while on the other hand interpretation of disturbance signals below a prescribed level is prevented.

During signal transmission, a fluctuation in the level of the transmission signals as well as disturbances and/or humming in the transmission channel can occur. Such fluctuations are sometimes so strong that at a steady ratio of signal : noise, the prescribed level of transmission can be undercut from time to time. This can lead to a blockage of signal interpretation even though the magnitude of signal : noise is sufficiently large. Moreover, certain modes of transmission require numerous switch-on-switch-off operations at the receiving (interpretation) station which, due to switching and interpretation delays also block signal interpretation although signals of sufficient magnitude are present. A transmission type of this kind is, for example, the so-called half-duplex-operation in which between two participating points of data exchange, a signal is sent from one station to the other and the other station returns a confirmation signal. In order to maintain the time necessary for switching from "send" to "receive" as minimal as possible and utilize the time for actual signal transmission most effectively, it is especially desirable to utilize a transmission level indicator signal which is independent of the switching process and free of delays.

SUMMARY OF THE PRESENT INVENTION

It is an object of the present invention to provide a circuit for the production of a transmission level indicator signal which meets the above requirements and effectively prevents against disturbances with as simple an arrangement as possible.

A circuit of the initially mentioned type is, for the solution of the task at hand, provided so that the transmission level signal is produced as an output signal of an integrator which receives a first direct voltage from the received signals and a second direct voltage of opposite polarity which is produced in relation to the first direct voltage in proportion to the prescribed transmission level.

With the present invention a transmission level signal is produced not by a special threshold switching arrangement which in turn is controlled by the received signals, but rather by a level signal derived from the signals themselves and which follows their amplitude. Since the first direct voltage obtained from the signals is superimposed on a second direct voltage which is produced proportionately to the first one in relation to the prescribed transmission threshold, a threshold behavior results for the control value of the integrator and thus for the transmission level indicator signal-producing switching arrangement. Since both direct voltages are derived from the data signals themselves, both direct voltages and the resultant level threshold are proportionate to and vary with the data signals. The level indicator signal thus automatically follows the data signals so that if the level of the data signals and the level of noise fluctuate in the same manner and at constant ratio of signal : noise and if a comparatively low signal level is at times undercut, an error free transmission level indication signal is achieved.

By utilization of an integrator switching arrangement as the source of the transmission level signal, it is possible to provide a signal which, depending on the presence of a control input signal, i.e., a signal which exceeds the prescribed level, has a prescribed polarity. If the incoming signal is of such nature that not the first, but the second direct voltage is domineering, the polarity of the output signal of the integrator changes which definitely indicates whether the level of the received data signals is sufficient for the detection or not.

A switching arrangement according to the invention works, as far as follow-up of the threshold level is concerned, with minimum delay. It assures a high degree of security from noises because a very simple proportioning of the level threshold is possible by superimposition of the two direct voltages, both of which are dependent on the signal level and which produce the control value for the transmission level signal. This proportioning is most efficiently effected when the threshold is at approximately 50% of the first direct voltage, i.e., the two direct voltages have a ratio of about 2:1. This is a favorable value for signal transmission in view of the statistical distribution of occurring disturbances and the ensuing signal : noise ratio.

The switching arrangement according to the invention also preferably includes means whereby the second direct voltage is produced in a circuit having a storage unit and a switch which is operated by the output signal of the integrator. With this arrangement, during transmission interruptions, as they exist, for example, in the half-duplex-system, at the absences of the transmission level signal, the second direct voltage can be inhibited. Simultaneously, the last available value of the second direct voltage is stored in the storage unit and is utilized, when the transmission interruption is finished, for the formation of the new transmission level indicator signal. When data signals are again received, the second direct voltage rapidly readjusts to the new data signals since the circuit necessary for the production of the second direct voltage is closed by the transmission level signal which is then again available.

With this latter circuit arrangement the output signal of the integrator is preferably coupled to a time-switch which emits a signal that opens the switch at the absence of the integrator output signal by a certain time.

After a long disruption of signals and/or a considerable pause in transmission, signal levels that are below the previously stored level-threshold immediately produce a transmission level indicator signal.

The switching arrangement according to the invention is preferably so arranged that an operational amplifier, coupled with an integration condenser, produces the second direct voltage and is connected at its control input to a transistor switch controlled by the output signal of the integrator, and connecting the first direct voltage as well as a counter-coupling resistor to the operational amplifier. Thus results a particularly simple circuit design within the circuit designed for the generation of the second direct voltage, because the operational amplifier, in the first switching position of the transistor-switch, operates as a normal, integrating amplifier, while in the second switching position functions only as a storage unit. The transistor switch is, therefore, used in a very simple way on one hand for the connection of the direct voltage produced from the received signals to the operational amplifier, and on the other hand, for changing the operational amplifier between two operating modes.

The transistor switch is preferably a MOS-field-effect transistor and the operational amplifier preferably comprises field-effect transistors. Due to the very high input resistance of the operational amplifier and the connection of the control input of the operational amplifier to the MOS-field-effect transistor, a relatively small integration condenser can be used and very good linearity of this amplifier and/or storage arrangement is realized.

By use of the operational amplifier a prescribed minimum output voltage can be produced at the operational amplifier by a simple additional outer connection. This minimum output voltage is fed to the input of the integrator also when a control signal for the amplifier is absent. It is thus possible to bias the integrator input with a "resting voltage" in the event sufficient signal level is absent so that also, in this case, an output signal of predetermined polarity is obtained from the integrator which changes its polarity to a definite second voltage value if the appropriate control signal is present.

A prime advantage of the invention is the fact that the second direct voltage derived from the data signals can, on one hand, be dimensioned according to a prescribed signal threshold and on the other hand, makes possible at the same time the follow-up of the threshold in a signal detection unit. With the switching arrangement of the invention it is thus possible not only to provide a transmission level indicator signal, but also to create simultaneously a control value, for example, for a data-detection, which is generated continuously with the level-fluctuations of the received signals.

BRIEF DESCRIPTION OF THE DRAWINGS

The present invention is described below with reference to the drawings in which.

DETAILED DESCRIPTION OF THE PRESENT INVENTION

Figure 1:
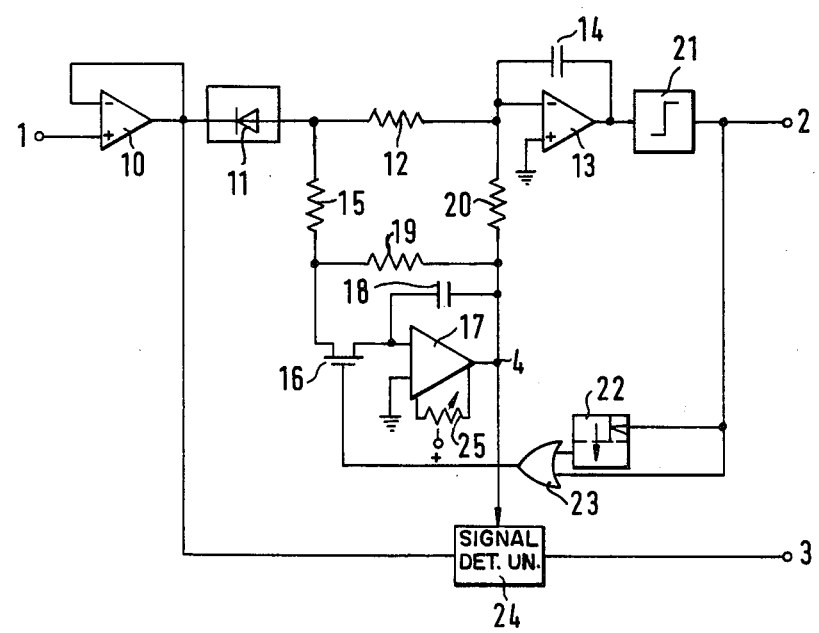
FIG. 1 is a block diagram of a switching arrangement according to the present invention for data transmission with double current signals.

Referring to FIG. 1, the received data signals are fed into an input 1 of an amplifier 10 which amplifies the signals to such a value that they, upon exceeding the conduction voltage of a peak level rectifier 11, generate a direct voltage at the output of the rectifier 11 with pulse shaped waveform according to the signals. The rectifier 11, depending on whether single or double voltage signals are processed, can be a one or two-way rectifier.

The direct voltage at the output of rectifier 11, which follows the amplitude of the received signals, is coupled via a resistor 12 to the inverting input of an integrator 13 having an integration condenser 14. Further, the output of rectifier 11 is coupled through a resistor 15 and a MOS-field-effect transistor 16 to the inverting input of an operational amplifier 17. An integration condenser 18 is coupled across the inverting input and the output of the amplifier 17 so that it may function as an integrator. Furthermore, a feed-back resistor 19 is provided which is effective, however, only when the field effect transistor 16 is switched on or is conducting. By the resistance ratio of resistors 15 and 19 the gain of operational amplifier 17 can be set. The output of the amplifier 17 is further connected via resistor 20 to the inverting input of the integrator 13, so that at this input the first direct voltage from resistor 12 and the second direct voltage from resistor 20 are superimposed. The resistance ratio of resistors 12 and 20 can be dimensioned so that these two control direct voltages have a ratio of approximately 2:1 in relation to each other, that is, that the second direct voltage at resistor 20 is of about half the amplitude of the first direct voltage at resistor 12.

The output of integrator 13 is connected to a switching output 2 via a threshold circuit 21 (e.g. a Texas Instrument Part No. SN75152) whereby an output signal at 2 can be utilized as a transmission level signal. In addition, the switching output 2 is connected to the gate of the MOS-field-effect transistor 16 via a monostable switch or multi-vibrator 22 and an OR-gate 23.

A signal detection unit 24 (e.g. a Texas Instrument Part No. SN75152) is illustrated in FIG. 1 which is controlled by the output signal of the operational amplifier 17 and which receives at its input the amplified data signals from the amplifier 10. A switching output 3 serves as the output for detected data signals which, in a manner yet to be described, are generated in dependence on an always entrained threshold value.

The switching arrangement illustrated in FIG. 1 operates as follows: As received signals are fed into input 1, the peak level rectifier 11 generates a pulse shaped direct voltage which is fed into the integrator 13 via resistor 12. Simultaneously, the integrator, as formed by the operational amplifier 17 by the now conducting MOS-field-effect transistor 16, generates a direct voltage which is proportional to the direct voltage at the output of the rectifier 11. Since this latter voltage is fed to the inverting input of the operational amplifier 17, the current flow into the resistor 20 is in the opposite direction from the current flow through resistor 12. If both direct voltages from these currents through resistors 12 and 20 are proportioned so that they approximate the amplitude ratio of 2:1, and if data signals are received which produce a first voltage at resistor 12 which exceeds the second voltage at resistor 20, the control voltage at the control input of the integrator 13 produces an output which runs positive. A positive output from the integrator 13 is indicative that the level of the received signals is sufficient for data detection, and thus, the positive output signal from the integrator 13 forms the transmission level signal.

A variable resistor 25 is preferably connected across the amplifier 17 over which a threshold potential can be established. The variable resistor 25 permits, in a very simple manner, a positive basic voltage to be fed to the control input of the integrator 13 which in turn, generates a definite, negative output voltage. A negative output voltage from the integrator 13 effects an activation of the mono-stable multi-vibrator 22 via the threshold switch means 21 and interrupts the output signal from the switch 22 for the duration of the time-constant of the switch 22 which turns off the MOS-field-effect transistor 16 for plus time. Thus, if a pause occurs in the data signals which leads to the absence of the transmission level signal at output 2, the MOS-field-effect transistor 16, which forms an electronic switch, is turned off. While the transistor 16 is turned off the feed-back resistor 19 is disconnected, and the amplifier 17 lacks an input signal and forms together with the integration condenser 18 a storage unit by means of which the last available output signal is continued. At the end of a transmission pause, i.e., when new data signals are received, the amplitude of the new data signals must exceed the threshold value of the stored output signal of the operational amplifier 17, in order to generate a new transmission level indicator signal at the output of integrator 13. In order to secure the production of the necessary transmission level indicator signal even if the level of received signals has fallen below a prescribed threshold, but the signal : noise ratio is favorable for an error-free interpretation, a new control signal for the monostable MOS-field-effect transistor 16 is produced following the end of the time-constant of mono-stable switch 22. The control signal is fed to the transistor 16 which switches on and couples the input of the operational amplifier 17 to the output from the amplifier 10 so that the operational amplifier 17 is ready to receive a new direct current voltage derived from the received signals. It is advisable to preset the time-constant of the mono-stable switch 22 so that the duration of the expected signal pauses is slightly exceeded. The OR-gate 23 has the effect that during shorter transmission pauses, a newly formed transmission level signal renders the mono-stable switch 22 ineffectual and the transmission level signal opens field effect transistor 16.

The continuous entrainment of the transmission level threshold value which is produced by superimposition of two direct voltages at the control input of integrator 13, is now easily understood. Both direct voltages follow the waveform of the data signal level; however, in order to generate a transmission level signal at output 2, the magnitude of the data signals must exceed the value of the second direct voltage which is connected to the integrator 13 via resistor 20. If this is not the case, no transmission level signal is generated by integrator 13. If no signals are received, no DC voltage is produced for control of integrator 13 according to the signal and only the positive basic voltage is fed to the integrator 13 which produces a negative output voltage of integrator 13 definitely indicating that no data signals are being received. Generation of a positive basic voltage from the operational amplifier 17 can, for example, be effected by adjustment of the variable resistor 25.

Since the direct voltage fed to the operational amplifier 17 via the MOS-field-effect transistor 16 follows the amplitude waveform of the received signals, the output voltage of the operational amplifier 17 can also be used for the entrainment of a threshold value for signal detection. For this, the detection unit 24 is provided which is controlled by the output signal of the operational amplifier 17 so that a prescribed threshold within the detection unit 24 changes with the amplitude of the signal level amplitude. If the received data signals are fed to the detection unit 24, data can be obtained on output 3 which are interpreted in dependence of the prescribed threshold value which follows the amplitude of the received signals and ensures disturbance-free reception with great accuracy.

Figure 2A:
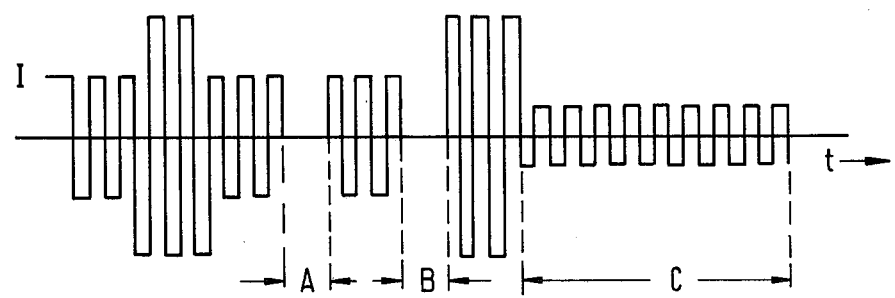
FIGS. 2A–2C are illustrations of signal waveforms within the switching arrangement of FIG. 1.
Figure 2B:
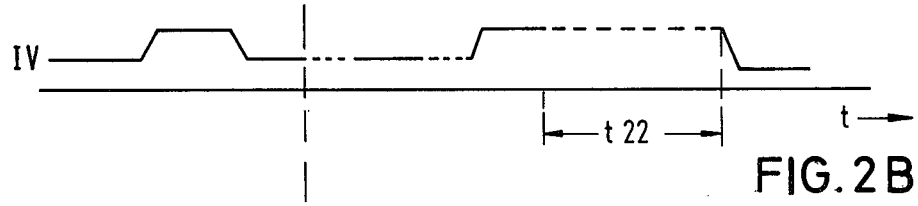
Figure 2C:
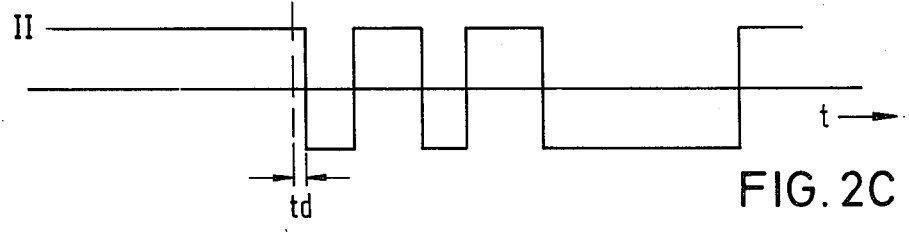

In FIGS. 2A–2C signal waveforms corresponding to nodes 1, 4 and 2 in FIG. 1, respectively are illustrated. These signal waveforms are marked I, II and IV. In FIG. 2A an incoming signal waveform I is represented with a digital voltage signal having alternating amplitude values and with transmission pauses A and B. The amplitude of signal I at C is lower than the previously entrained threshold value and is considered a transmission pause during which the mono-stable switch 22 is in effect.

In FIG. 2B the waveform of the direct voltage is illustrated at the output 4 of the operational amplifier 17. This direct voltage follows the amplitude of the received data signals which means that it has, initially substantially constant value which changes with the alternation of the amplitude of the incoming data signals I. If the amplitude of the incoming data signal drops again, the direct voltage IV also drops. The waveform of this direct voltage IV is, during the transmission pauses A and B as well as during part of the time-period C, illustrated in phantom line. During these time periods, the transistor 16 is turned off and the integration capacitor 18 and operational amplifier 17 operate as a storage unit and maintain the previously present voltage value at node 4. If an incoming data signal now appears at C with an amplitude smaller than the prescribed threshold value at the output of operational amplifier 17, the mono-stable switch 22 again turns on the transistor 16 after elapse of the full time constant of the switch t22 as indicated at 22 in the signal IV of FIG. 2B.

After the time-constant elapses, it is assumed that the signal-amplitude of signal I has not yet changed. Thus, the operational amplifier 17 which is now connected via the field effect transistor 16 to the data signal I, produces an output voltage which is less than the initial value shown at the waveform IV since the output of the amplifier 17 is again controlled by the amplitude of the then received data signal I. This new, direct voltage can be either equivalent to the voltage as determined by the variable resistor 25 or slightly above same. If the signals arriving at this time produce a direct voltage at resistor 12, which exceeds this other direct voltage, a transmission level signal is again generated.

In FIG. 2C the transmission level signal is illustrated at II. The signal II has an amplitude determined by the threshold value of the threshold switch 21. The transmission level signal is positive as long as the direct voltage is present and the incoming data signals at the input of integrator 13 exceed the direct voltage IV. Otherwise, e.g. during transmission intervals A and B, the polarity of the transmission level signal changes with a slight delay caused by the time-constants of integrator 13 and its integration condenser 14, in connection with resistors 12 and 20. This delay also occurs in the ensuing alternation of polarity of the transmission level signal, but is not further indicated in FIG. 2B.

During the transmission intervals A and B, a polarity change of the transmission level signal results which can be utilized at switching output 2. When the amplitude of the incoming data signals exceeds a predetermined amount, the transmission level signal again becomes positive and characterizes a sufficient signal level in dependence of the signal: noise ratio in the already described manner. During the time period t22 the amplitude of the incoming signals undercuts the prescribed threshold value determined by the direct voltage of signal IV, so that the transmission level signal becomes negative. After time t22 has elapsed, a signal amplitude is present which is considerably less than the previously received signal amplitude values. However, since the data signal exceeds the then much lower direct voltage value IV at the input of integrator 13, the integrator 13 again generates a transmission level signal at its output 2.

In conclusion, it should be noted that in connection with the above described embodiment of the invention the transmission of binary voltage signal with a rectangular-shaped waveform has been described. Those skilled in the art, however, will understand that sinusoidal incoming signals can also be processed according to the present invention.

What is claimed is:

1. A circuit arrangement for the production of a transmission level indicator signal for use with receiver means adapted to receive a transmission of data signals which are interpreted whenever the data signals exceed a predetermined transmission threshold, said circuit arrangement comprising:
    an integrator;
    means for applying a first direct voltage to the input of said integrator proportional to the amplitude of the received data signals; and
    means for applying a second direct voltage of opposite polarity from the first voltage to the input of said integrator whereby said first and second voltages are superimposed, said second voltage being substantially in the same proportion to the first voltage as the transmission threshold, said second voltage feeding means further comprising means for storing said second voltage and switch means responsive to the integrator output for connecting the storing means with the integrator input, wherein the output of the integrator forms the transmission level indicator signal.

2. The circuit as defined in claim 1 and including time switch means responsive to the integrator output and operable to deactivate said switch means for a predetermined time duration following disappearance of the integrator output.

3. The circuit arrangement as defined in claim 1 wherein said storing means further comprises an operational amplifier coupled with an integration condenser which stores the second direct voltage, and further including a transistor switch controlled by the output of the integrator which connects the first direct voltage as well as a feed-back resistor to the operational amplifier input upon activation.

4. The circuit arrangement as defined in claim 3 wherein transistor switch is an MOS-field-effect transistor.

5. The circuit arrangement as defined in claim 2 wherein the time switch is a monostable multivibrator with a time constant slightly longer than the expected interruptions in the data signal.

6. The circuit arrangement as defined in claim 3 and including means for biasing a control input of said operational amplifier to produce a predetermined minimum output voltage of the operational amplifier.

7. The circuit arrangement as defined in claim 1 wherein the second direct voltage is applied to a threshold control input of a signal detection unit for controlling the threshold of the signal detection unit, said signal detection unit having an input connected to a signal proportional to the received data signals and having an output on which a signal proportional to the received data signals is generated in dependence upon the voltage applied to the threshold control input.

8. A circuit arrangement for the production of a transmission level indicator signal for use with receiver means adapted to receive a transmission of data signals which are interpreted whenever the data signals exceed a predetermined transmission threshold, said circuit arrangement comprising:
    an integrator;
    means for applying a first direct voltage to the input of said integrator proportional to the amplitude of the received data signals; and
    means for applying a second direct voltage of opposite polarity from the first voltage to the input of said integrator whereby said first and second voltages are simultaneously applied to said integrator input and are superimposed, said second voltage being substantially in the same proportion to the first voltage as the transmission threshold, said second voltage applying means further comprising means for storing said second voltage and switch means responsive to the integrator output for connecting the storing means with the integrator input wherein the output of the integrator forms the transmission level indicator signal.

9. The circuit as defined in claim 8 and including time switch means responsive to the integrator output and operable to deactivate said switch means for a predetermined time duration following disappearance of the integrator output.

10. The circuit arrangement as defined in claim 8 an including an operational amplifier coupled with an integration condenser which stores the second direct voltage, and a transistor switch controlled by the output of the integrator which connects the first direct voltage as well as a feed-back resistor to the operational amplifier input upon activation.

11. The circuit arrangement as defined in claim 10 wherein the transistor switch is an MOS-field-effect transistor.

12. The circuit arrangement as defined in claim 9 wherein the time switch is a monostable multivibrator with a time constant slightly longer than the expected interruptions in the data signal.

13. The circuit arrangement as defined in claim 10 and including means for biasing a control input of said operational amplifier to produce a predetermined minimum output voltage of the operational amplifier.

14. The circuit arrangement as defined in claim 8 wherein the second direct voltage is applied to a threshold control input of a signal detection unit for controlling the threshold of the signal detection unit, said signal detection unit having an input connected to a signal proportional to the received data signals and having an output on which a signal proportional to the received data signals is generated in dependence upon the voltage applied to the threshold control input.

* * * * *